(12) United States Patent
Lang et al.

(10) Patent No.: US 7,682,032 B2
(45) Date of Patent: Mar. 23, 2010

(54) APPARATUS FOR PIVOTING A MIRROR ASSEMBLY

(75) Inventors: Heinrich Lang, Ergersheim (DE); Albrecht Popp, Weihenzell (DE)

(73) Assignee: Lang Mekra North America, LLC, Ridgeway, SC (US)

( * ) Notice: Subject to any disclaimer, the term of this patent is extended or adjusted under 35 U.S.C. 154(b) by 0 days.

(21) Appl. No.: 12/283,833

(22) Filed: Sep. 16, 2008

(65) Prior Publication Data

US 2009/0040637 A1     Feb. 12, 2009

Related U.S. Application Data

(63) Continuation of application No. 10/229,343, filed on Aug. 27, 2002, now Pat. No. 7,497,580.

(30) Foreign Application Priority Data

Oct. 2, 2001    (DE) ............................... 101 48 611

(51) Int. Cl.
*G02B 7/182*    (2006.01)
(52) U.S. Cl. ................................. 359/877

(58) Field of Classification Search ........... 359/841, 359/871, 872, 877
See application file for complete search history.

(56) References Cited

U.S. PATENT DOCUMENTS

| | | | | |
|---|---|---|---|---|
| 4,728,181 A | * | 3/1988 | Kakinuma | 248/549 |
| 5,867,328 A | * | 2/1999 | Stapp et al. | 359/841 |
| 6,270,227 B1 | * | 8/2001 | Tsuyama | 359/871 |
| 6,276,808 B1 | * | 8/2001 | Foote et al. | 359/877 |

* cited by examiner

*Primary Examiner*—Stephone B Allen
*Assistant Examiner*—Jennifer L. Doak
(74) *Attorney, Agent, or Firm*—McNair Law Firm, P.A.; Seann P. Lahey

(57) ABSTRACT

A bearing apparatus for pivotally moving a carrying arm relative to an anchorage is provided. The carrying arm may carry a mirror for a vehicle, the anchorage mountable to the vehicle. The bearing apparatus has a bushing located between the carrying arm and the anchorage in which a pivot bearing apparatus is moveably disposed. In one embodiment the pivot bearing apparatus has a control component and a come-along part relationally disposed about a shaft and movably connected to the control component. When the shaft is rotated, the come-along part moves along the shaft to rotate the control component. In turn, the control component transfers its rotation to pivot the carrying arm.

24 Claims, 3 Drawing Sheets

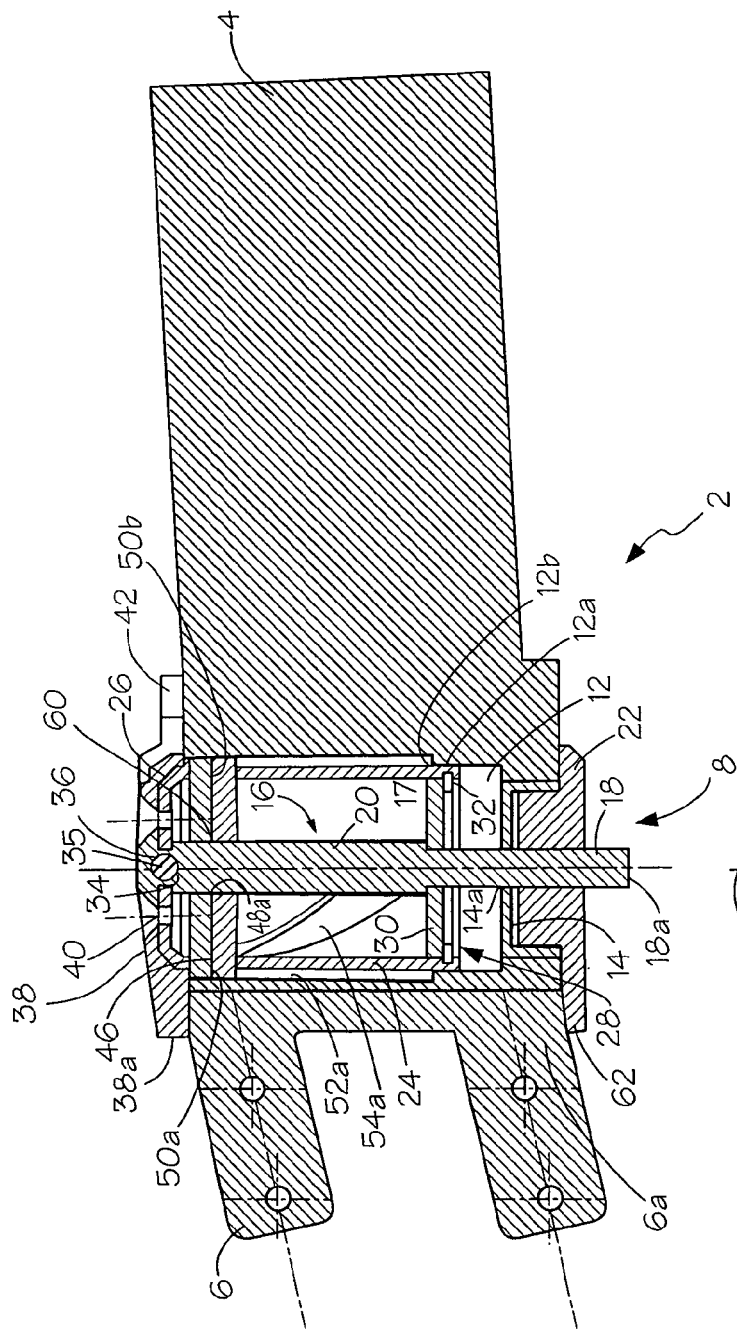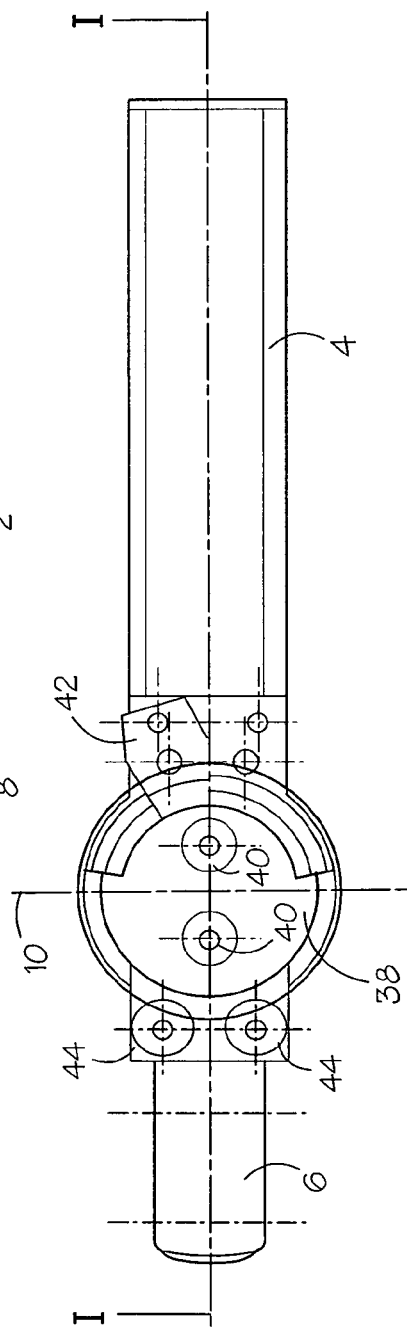

APPARATUS FOR PIVOTING A MIRROR ASSEMBLY

CROSS REFERENCE TO RELATED APPLICATION

This application is a continuation of application Ser. No. 10/229,343 filed Aug. 27, 2002 now U.S. Pat. No. 7,497,580 having the same title.

FIELD OF THE INVENTION

The invention relates generally to an apparatus for pivoting a carrying arm of a mirror. More particularly, a bearing is provided in an anchorage affixed to a vehicle body for pivoting the carrying arm of an external mirror relative to the vehicle body.

BACKGROUND OF THE INVENTION

For a considerable time, it has been the customary practice to design the carrying arm for an outside mirror on a motor vehicle to pivot about an anchorage affixed to a body of the vehicle. At least one reason for this is the necessity in certain situations to be able to fold or swing the carrying arm, along with the outside mirror, out of its normal outwardly extended position from the body into a folded or swung-in position. When folded, the carrier arm is then essentially parallel and adjacent a surface of the body. This is required, for instance, in passing through a wash apparatus, or driving through particularly narrow passageways where the extended mirror could collide with bordering obstructions. Further, by pivoting the carrying arm relative to the anchorage, assurance is provided that upon an impact of the mirror against an obstacle, the carrying arm will yield to the obstacle and possibly reduce or prevent damage to the outside mirror.

When the outside mirror strikes an obstacle, the carrying arm may pivot automatically. At other times it is possible to intentionally or selectively pivot the outside mirror, such as prior to driving through a narrow alley or through a vehicle wash. However, until now it has always been necessary that the driver of the vehicle pivot the outside mirror by hand into the folded position. If the vehicle has an outside mirror mounted on the passenger or right side, as is generally the case, then the driver is obliged to stop the vehicle, dismount, and pivot this right side mirror against the body.

If the motor vehicle happens to be an emergency vehicle, and at the same time a truck or a bus, then the outside mirrors are often mounted so high that they simply cannot be reached for angular adjustment from the ground without auxiliary access such as a step ladder.

BRIEF SUMMARY OF THE INVENTION

The invention provides an apparatus for a pivotal bearing for a carrying arm of an outside mirror of a motor vehicle relative to an anchorage affixed to the vehicle body. The component parts of the invention are simple, reliable, and economical to manufacture, assemble, and use. Other advantages of the present invention will be apparent from the following description and the attached drawings, or can be learned through practice of the invention.

In accord with an aspect of the invention, the apparatus with the pivotal bearing for the carrying arm for the outside mirror of the motor vehicle has a pivot bearing installed between an anchorage affixed to the body and the carrying arm. A pivoting motion of the carrying arm in relation to the body-affixed anchorage about a rotation axis of the pivot bearing is effected by an auxiliary drive, which engages the pivot bearing.

The auxiliary drive, acting at the pivot bearing, eliminates the necessity to manually pivot the carrying arm in relation to the body-affixed anchorage. Thus, the driver of the motor vehicle can pivot the carrying arm relative to the anchorage by the activation of the auxiliary drive, possibly by touching a button. Therefore, to accomplish a pivoting motion of the outside mirror on the passenger side, for instance, it is no longer necessary for the driver to take extra steps such as dismounting from the vehicle. Also, hard-to-reach or inaccessible outside mirrors can be easily pivoted.

By way of further example, the auxiliary drive activates an externally applied torque, which is converted in a transmission mechanism within the pivot bearing into a pivoting motion. Torque can be easily generated, in accord with one embodiment, by a motor, especially an electric motor. Further, the transmission mechanism is found in this aspect of the invention in the pivot bearing where the transmission mechanism converts the torque into a pivoting motion. Moreover, since the transmission mechanism is located in the pivot bearing, the entire, invented apparatus is compact and small.

With the aid of the transmission mechanism, and if necessary in connection with the motor serving as auxiliary power, a certain inherent resistance can be lent to the pivot bearing. In this way, the carrying arm, along with the outside mirror, is safely held in position relative to the body-affixed anchorage. Thus, the mirror is more resistant to wind dynamics, such as when the vehicle is in motion, and therefore, resistant to vibrations. In the event the outside mirror strikes an immovable obstruction, however, this inherent resistance can be overcome by a predetermined force, so that, without other aid, the mirror will give way on its own.

In another aspect of the invention, the angular range of the pivoting motion is advantageously limited. The limitation assures that the carrying arm can attain two specified end positions relative to the anchorage. One end position is that of the fully extended mirror and the other end position represents the completely folded-in mirror.

By changing a rotation of the auxiliary drive, the mirror can pivot to fold not only "in" but also "out."

In one aspect of the invention, the transmission mechanism exhibits:
 a) a shaft aligned with the axis of rotation of the pivot bearing, which is furnished with an outer thread at least over a partial section of its axial extent to carry out torque conversion;
 b) a come-along part, which is in threaded engagement with the outer threading of the shaft, is further situated proximal to the body-affixed anchorage, and upon the rotation of the shaft, moves linearly along the longitudinal axis of the shaft;
 c) a control component turnably installed opposite to the body-affixed anchorage, which at least exhibits a control curve that displaceable by the come-along part, so that a linear motion of the come-along part along the shaft is converted to a rotary motion of the, control component; and
 d) a connection between the control component and the carrying arm of the mirror for the transmission of the turning movement of the control component to the carrying arm.

In the foregoing aspect, the connection between the control component and the carrying arm is effected by a transfer member, which is turnably connected with the control component.

In accord with another embodiment, the come-along part can be made part of the carrying arm, and the control component can be installed to be turnably affixed relative to the carrying arm. In the design or construction, a connection between the control component and the body-affixed anchorage transmits a rotational movement of the control component to the body-affixed anchorage. The carrying arm, relative to the body-affixed anchorage, is thereby pivoted. In contrast to the previous embodiment, this embodiment or construction formulation generates, more or less, a kinematic turn-around in which the same effects and advantages are achievable.

More specifically, the shaft and the control component are arranged coaxially and are placed in a bearing bushing designed as one part with the body-affixed anchorage. Due to the coaxial arrangement, the designed construction is optimal and the least possible footprint is achieved.

In an advantageous embodiment, the come-along part possesses a mid-piece provided with an internal threading to accept the outer threading of the shaft. At least one lug extends from the shaft and runs in a guide groove in the bearing bushing to position the come-along part. The mid-piece can be designed so that it has available sufficient material for the construction of the threaded opening. The at least one lug extending from the mid-piece runs into a guide groove made in the side of the bearing bushing. Accordingly, precise guidance of the come-along part in reference to the bearing bushing is assured when the outer threading of the shaft turns in the threaded opening of the come-along part, which invokes a displacement of the come-along.

Advantageously, in the mid-piece of the come-along are two projecting lugs, which are disposed from one another, for example, at a circumferential distance of 180. The two lugs run in two correspondingly separated guide grooves in the side of the bearing bushing which makes guidance of the come-along part especially precise and easy. Moreover, the guidance groove(s) runs parallel to the axis of pivot rotation. Thus, the come-along part, relative to the bearing bushing, is movable along its longitudinal axis, yet can turn relative to the bearing bushing.

In one aspect, the control component possesses two control curves separated from one another by 180°, which are penetrated by the two projecting lugs of the come-along part. When a linear movement of the come-along part takes place along the guide grooves running parallel to the axis of rotation of the pivot, the control curves, which are penetrated by the two projections of the come-along part, convert this linear movement into a corresponding turning motion of the control component.

Alternatively, the guide groove(s) can run spirally in the bearing bushing and the control curves in the control component run in a straight line and parallel to the axis of rotation of the pivot. In this case, as the come-along part moves straight down, it also is now given a turning movement because of the spiral guide grooves, which is again transmitted to a corresponding turning movement of the control component.

In one embodiment, the control component has the shape of a shell, which is essentially closed as to the upper part and open below. This construction is advantageous from the standpoint of manufacturing and mounting technology. Also, the closed upper end makes it possible to attach a transfer plate to the upper end, which imparts the pivoting motion of the control component to the carrying arm of the mirror.

In the essentially closed end of the shell, a turning bearing is provided, in particular, one bearing ball, which acts between an end recess in the shaft and the transfer plate. In this way, a particularly free turning motion of the shaft is assured on the one hand, and on the other, an eased relative motion between shaft and transfer plate is achieved.

The open end of the shell, that is, the lower end, is closed by a positioning disk in one aspect of the invention. The disk is penetrated by the shaft, such that the shell is stressed between the turning bearing and the positioning disk. This arrangement provides unobstructed guidance of the control component; i.e., the shell.

In a further aspect, the transfer plate is screwed together with the control component and the carrying arm, which is advantageous from the standpoint of assembly and maintenance.

If, advantageously, in a further step, the shell is at least circumferentially guided on the inside wall of the bearing bushing by a part of its longitudinal extension, then the shell is additionally protected from any tilting moments.

Furthermore, on the anchorage affixed to the body, a bearing can be placed or constructed to guide that end of the shaft remote from the turning bearing. For instance, this bearing can prevent any tilting moments or misalignments from acting on the shaft.

BRIEF DESCRIPTION OF THE DRAWINGS

Further details, aspects, and advantages of the present invention are apparent from the following descriptions aided by reference to the drawings in which:

FIG. 1 is a sectional view of an aspect of the invention taken along line I-I of FIG. 2;

FIG. 2 is a top view of the example shown in FIG. 1;

DETAILED DESCRIPTION OF THE DRAWINGS

Figure 3:
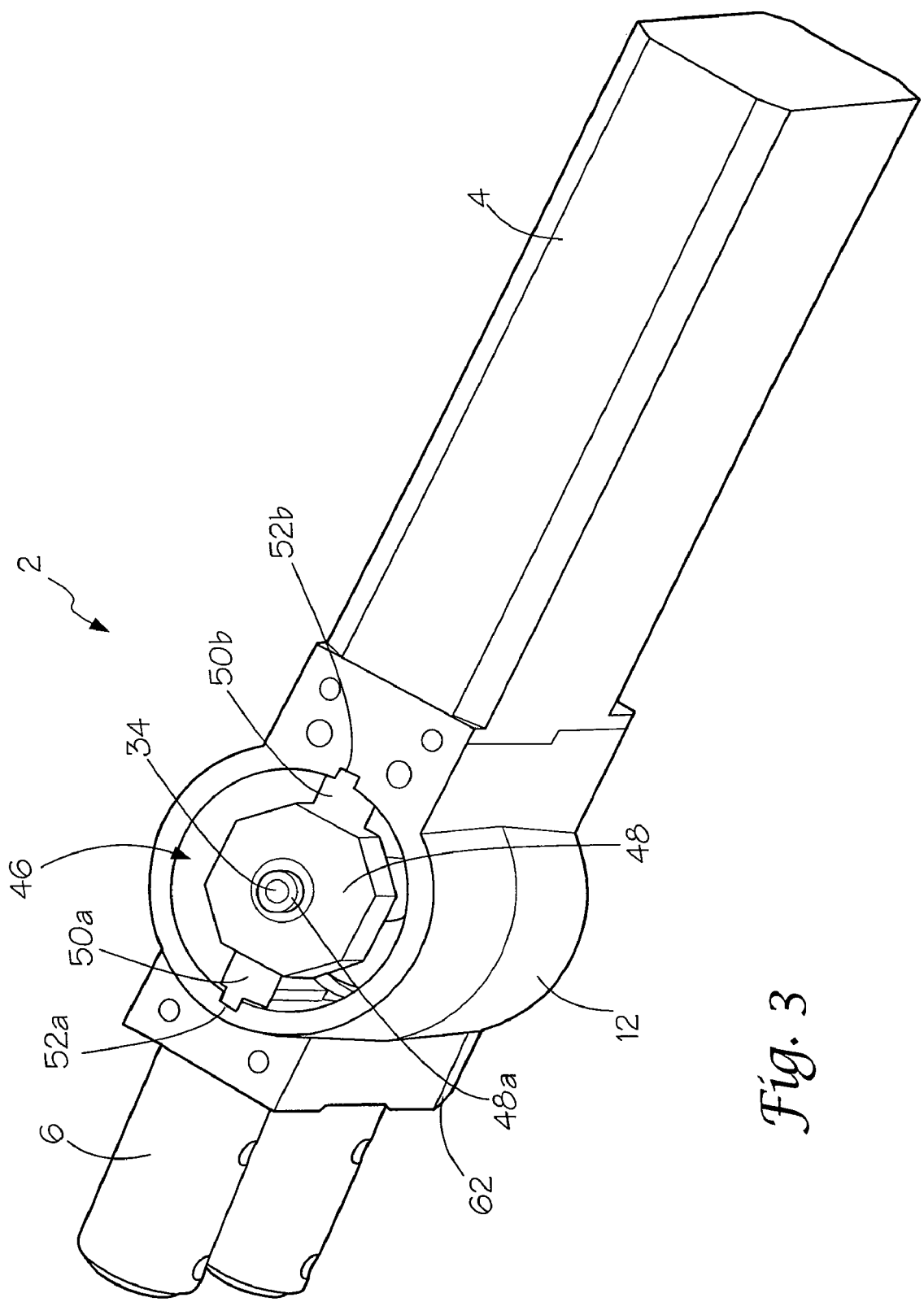
FIG. 3 is a top perspective view of the example as in FIG. 1 with a control component and a transfer plate removed to more clearly illustrate a come-along part.

Detailed reference will now be made to the drawings in which examples embodying the present invention are shown. The drawings and detailed description provide a full and detailed written description of the invention, and of the manner and process of making and using it, so as to enable one skilled in the pertinent art to make and use it, as well as the best mode of carrying out the invention. However, the examples set forth in the drawings and detailed description are provided by way of explanation only and are not meant as limitations of the invention. Thus, the present invention includes any modifications and variations of the following examples as come within the scope of the appended claims and their equivalents. It is to be noted that the detailed description uses numerical and letter designations to refer to features in the drawings. Like or similar designations in the drawings and description have been used to refer to like or similar parts of the invention.

An apparatus generally designated by the number 2, in accord with FIGS. 1 to 3, includes an anchorage 4 affixed to a motor vehicle body (not shown) and a carrying arm 6 for an outside mirror (not shown) of the motor vehicle. A pivot bearing 8 is placed between the anchorage 4 and the carrying arm 6. This arrangement permits the carrying arm 6 to pivot relative to the anchorage piece 4. Additionally, the pivot bearing 8 possesses an axis of rotation 10 about which the carrying arm 6 turns during its pivoting motion.

In the area of the pivot bearing 8, on the anchorage 4, a bearing bushing 12 is installed. This bearing bushing 12, as seen in FIG. 1, is open at the top and closed At the bottom 14. Also located in this bearing bushing 12 is a shaft 16, coaxial to the pivot axis 10. By a corresponding opening 14*a*, this shaft 16 movably penetrates the bushing bottom 14. Essentially, the shaft 16 can be considered as constructed of two sections, namely a lower section 18, which penetrates the opening 14*a* in the bushing bottom 14 and a threaded section 20 with an external thread.

In the area of the lower section 18 of the shaft 16 as seen in FIG. 1, a stationary bearing or cap 22 is placed on the anchorage 4. The bearing 22 is also penetrated by the lower section 18 of the shaft 16. A free end 18*a* of the lower section 18 is connected with an auxiliary drive (not shown). This drive can be a motor which can set the shaft 16 into a rotary motion.

Also found in the bearing bushing 12 is a shell shaped control component 24 (not shown in FIG. 3) which is coaxial to the pivot axis 10. The control component 24 possesses an essentially closed upper end 26 and also an open lower end 28. The lower end 28 is closed by a positioning disk 30, which is blocked by a retaining ring 32 from slipping out of the lower open end 28 of the control component 24. The positioning disk 30 is also penetrated by the lower section 18 of the shaft 16.

The control component 24, in the area of its lower end 28, is guided circumferentially on an inner wall 12*b* of the bearing bushing 12, so that the control component 24 is better protected against any tilting moment. The bearing bushing 12, for this purpose, exhibits a projection 12*a*.

Figure 4:
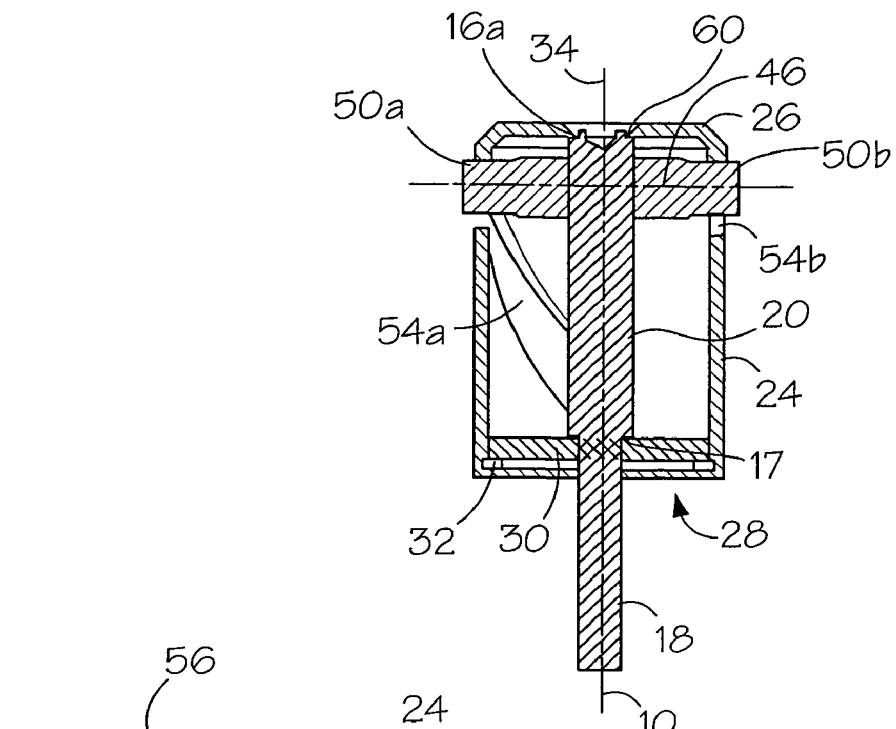
FIG. 4 is a sectional view similar to the illustration of FIG. 1 without an anchorage and a carrying arm to better show the control component, the come-along part and a shaft according to one aspect of the invention.

In FIG. 1, above the positioning disk 30, the externally threaded section 20 of the shaft 16 begins. This threaded section 20, as may be seen in FIG. 1 and also FIG. 4, is of greater diameter than the lower section 18, so that the shaft 16, with the greater diameter or projection 17 and threaded section, can be seated on the positioning disk 30. At the upper end of the threaded section 20, the shaft 16 shows a recess 34 in which a ball 36 is held. The ball 36 lies, as seen in FIG. 1, between the recess 34 of the shaft 16 and a complementary recess 35 in a cover 38, which simultaneously serves as a transfer plate. The transfer plate 38 is turnably connected with the upper end 26 of the control component 24 such as by screws through corresponding borings 40. A hold-down device 42 on the anchorage 4 prevents a situation in which the transfer plate 38 in FIG. 1 is lifted upward, but at the same time, permits a rotary motion of the transfer plate 38. As may be seen further in FIG. 2, the transfer plate 38 is held turnably to the carrier arm 6 by screws 44.

On the threaded section 20 of the shaft 16, runs a come-along part 46, which is best seen in FIG. 3 where, for the sake of clarity, the control component 24 has been omitted. The come-along part 46 exhibits a mid-piece 48 in which an internal thread 48*a* is tapped for the acceptance of the outside threading of section 20 of the shaft 16. In the embodiment shown in FIG. 3, two lugs 50*a* and 50*b* extend radially outward from the mid-piece 48. These lugs, 50*a* and 50*b*, with their outer free ends, run in the inner, circumferential wall 12*b* of the bearing bushing 12. Thus, the come-along part 46 is shown as being unturnable, but slidingly keyed to the bearing bushing 12 and hence, affixed relative to the anchorage 4. Thus, in the case of a rotation of the shaft 16, because of the thread engagement between the threaded section 20 and the inside threading 48*a* of the come-along part 46, the come-along part 46 can move linearly along and parallel to the axis of pivot rotation 10. Accordingly, the direction of travel of the come-along part 46, whether up or down, is correlated to the direction of rotation of the shaft 16.

As seen in FIGS. 1 and 4, the two lugs 50*a* and 50*b* of come-along part 46 are guided by their free ends in the guide grooves 52*a* and 52*b* while simultaneously penetrating two control curves 54*a* and 54*b* located in the outer circumference of the control component 24. The control curves 54*a* and 54*b* possess, in accord with one embodiment seen in FIG. 5, a straight line/spiral shaped contour. A starting point 56 of curve 54*a*, for example, which lies proximal to the upper end 26 of the control component 24, is somewhat circumferentially offset relative to an end point 58. Moreover, the starting point 56 to end point 58 are offset relative to the axis of rotation 10 of the pivot, so that the control curves 54*a* and 54*b* have a course corresponding to a section of a screw thread or a helix. Also in FIG. 5, the upper opening 60 is visible, which is penetrated by the upper free end 16*a* of the shaft 16 with the recess 34.

By way of example, an operation and manner of functioning of the apparatus 2 in accord with one aspect of the invention is as follows:

The assumption is made that at the beginning of the pivoting action, the apparatus 2 finds itself in the position shown in FIG. 1. More specifically, the come-along part 46 lies in the upper end area of the threaded section 20 in immediate proximity to the closing top 26 of the control component 24, so that the lugs 50*a* and 50*b* are situated at the respective starting points 56 of the control curves 54*a* and 54*b*. A driving torque, such as torque from a motor, on the lower section 18 puts the shaft 16 into rotation. The come-along part 46 remains unturnable, since its lugs 50*a* and 50*b* extend beyond the curves 54*a*,54*b* into the guide grooves 52*a* and 52*b* on the anchorage 4. Accordingly, and also due to the thread engagement between the threaded section 20 and the threading 48*a* in the mid-piece 48 of the come-along part 46, the come-along part 46 now moves without turning—with a corresponding rotary motion of the shaft 16 being presupposed—from the position in FIG. 1 downward in a direction of the lower end 28; i.e., toward the positioning disk 30.

The movement, both linear and downward, of the come-along part 46 is converted by the lugs 50*a*,50*b* in the inclined, or screw-like shaped, control curves 54*a* and 54*b* into a corresponding rotary motion of the control component 24. The rotary motion of the control component 24 is communicated to the top cover or transfer plate 38 by screw fastenings in the borings 40 and by an extension 38*a* from plate 38 fastened by screws 44 to the carrying arm 6.

Figure 5:
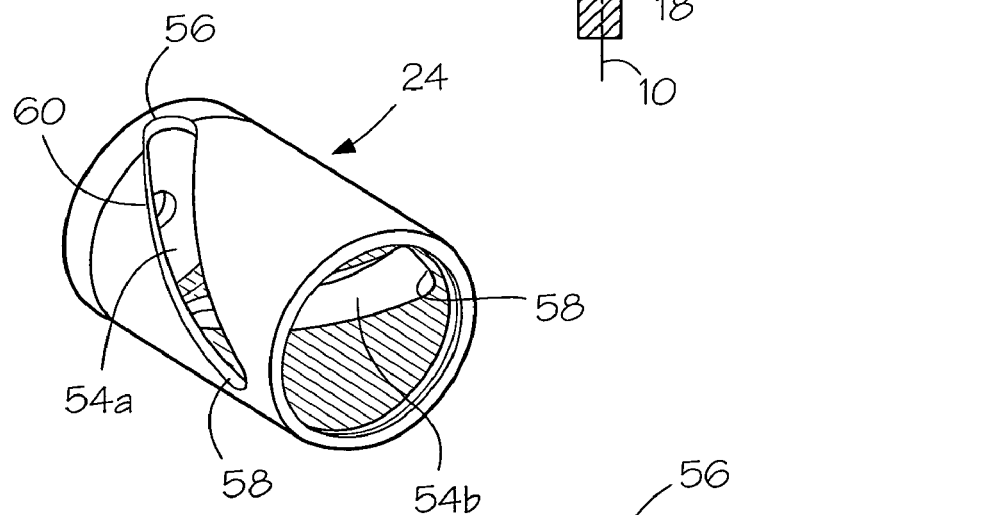
FIG. 5 is a perspective view of an embodiment of the control component.

A lower section 6*a* of the carrying arm 6 supports itself in this arrangement on a flange 62, which is integral with the bearing part 22. Upon reaching the end point 58 of the control curves 54*a* and 54*b* as seen in FIG. 5, the carrying arm 6 is in its maximum pivoted position relative to the anchorage 4. Accordingly, the motor stops supplying torque to the under section 18*a* of the shaft 16. For example, the stopping of the motor upon the reaching of the end point 58 (as well as the start point 56) can be effected by a limit switch or the like.

For the reverse pivoting of the carrying arm 6 relative to the anchorage 4 back into its start position, the direction of rotation of the torque affecting the shaft 16 is reversed, so that the come-along part 46 is moved from below to above, as seen in FIG. 1. By this movement, the lugs 50*a* and 50*b* in the control curves 54*a*, 54*b* again carry out a corresponding turning motion of the control component 24. This turning motion, substantially opposite to the linear, downward motion described above, acts upon the carrying arm 6 via the transfer plate 38 and acts to reverse the carrying arm 6 into its starting position. As soon as the lugs 50a and 50b have reached the starting point 56 of the control curves 54a and 54b, then the apparatus 2 is again positioned as shown in FIG. 1, and the auxiliary motor is stopped, which had been turning the shaft 16.

Figure 6:
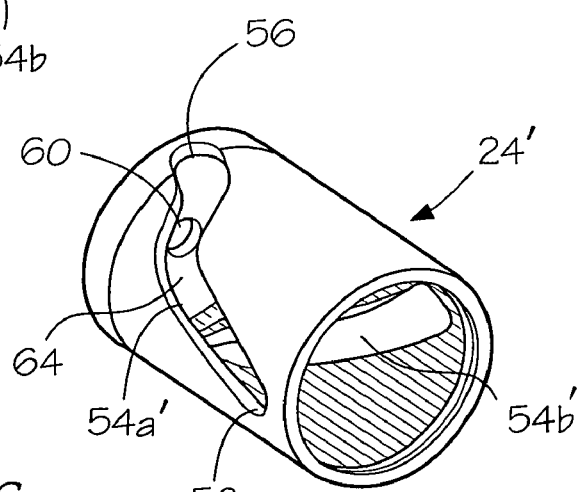
FIG. 6 is a perspective view of a variant embodiment of the control component.

FIG. 6 shows a variant of the control component 24 seen in FIG. 5, for example. The control component 24' seen in FIG. 6 differs from the control component 24 depicted in FIGS. 1, 4, 5 in that the alternate control curves 54a' and 54b' do not have the continual course of the control curves 54a and 54b described above. More specifically, alternate curves 54a',54b' have a discontinuity or a bend 64. The bending course provided by the control curves 54a' and 54b' supplies a unique pivoting procedure between the anchorage 4 and the carrying arm 6. For example, the embodiment of FIG. 6 provides a slow pivoting at the start 54, followed by a more rapid pivoting in a mid zone corresponding to the bend 64 and then again, a slow rotating movement when approaching the end position 58. Obviously, other forms of the control curves deviating from FIG. 6 are possible.

In addition to modifying the control curves 54a,54b, a multiplicity of modifications and alterations is contemplated by the invention. For example, in the previously described and illustrated embodiments, the guide grooves 52a and 52b in the anchorage part are designed in straight lines and parallel to the pivoting axis 10. Further, the control curves 54a and 54b have somewhat the contour seen in FIG. 5 or FIG. 6. This arrangement can just as well be turned about. Specifically, the guide grooves 52a and 52b can be given a screw or helical curvature, and the control curves 54a and 54b of the control component 24 can be conversely designed as linear to run parallel to the pivot axis 10.

In the case of a threadedly forced movement of the come-along part 46 either down or up as directed by the thread engagement between the threaded section 20 and the inner thread 48a in the mid-piece 48 of the come-along part 46, the come-along piece 46 is now set into rotary motion, in contrast to the foregoing embodiment in which the control component 24 rotates. This alternative rotation of come-along piece 46 is due to the engagement of the lugs 50a and 50b in the now screw or helix contoured guide grooves 52a and 52b.

Since the lugs 50a and 50b are also engaged with the now straight line control curves 54a and 54b on the control component 24, the rotation is communicated again onto the control component 24, then from there, as before, onto the transfer plate 38 and so onto the carrying arm 6. Also in a similar manner described above, upon a movement of the come-along part 46 in FIG. 1 from bottom to top, the direction of motion of the carrying arm 6 is correspondingly reversed.

In a further embodiment, both the guide grooves 52a and 52b and the control curves 54a and 54b can be arranged to run in screw or helix shape or pattern, or also both be otherwise (see FIG. 6) contoured either alike or dissimilarly. In this arrangement, a motion superimposition can be achieved, and the pivoting procedure may be given optional characteristics.

Further, a complete reversal of the arrangement is possible, if the bearing bushing 12 is constructed as a part of the carrying arm 6. In such a case, the come-along 46 relates to the carrying arm 6, and the control component 24 turns with the carrying arm 6. A connection, somewhat similar to that of the transfer plate 38, transfers a rotary motion between the control component 24 and the body based anchorage 4, and on account of this, the carrying arm 6 once again pivots relative to the anchorage 4. Also in this variation, the additional variations in contours of the guide grooves 52a,52b and control curves 54a,54b as described above can be equivalently employed.

An additional possibility is to provide another auxiliary drive unit or mechanism in lieu of a motor to act upon the lower section 18 of the shaft 16. The alternative drive could be, for example, a hydraulic or a pneumatic cylinder, the piston rod of which would engage a lever on the lower section 18. Further, the auxiliary drive, for instance, in the form of an electric motor, need not be directly connected onto the lower section 18 of the shaft 16. The auxiliary drive can be apart from the lower section 18 in which a connection between the drive shaft of the motor and the lower section 18 of the shaft 16 is made over a flexible shaft or the like. These flexible shafts can be set into rotation by the driver if necessary. In this way, the carrying arm 6 can be manually adjusted or pivoted in relation to the body-affixed anchorage 4 by the driver without requiring the driver to leave the driver's seat.

In any case, the auxiliary drive on the lower section 18 is so designed that upon the impact of the mirror fastened on the carrying arm 6 against an obstruction, the entire apparatus 2 can rotate itself about the pivot bearing 8 making it possible for the mirror and the carrying arm 6 to swing out of danger.

It will be apparent to those skilled in the art that various modifications and variations can be made in the present invention without departing from the scope and spirit of the invention. For example, specific shapes of various elements of the illustrated embodiments may be altered to suit particular applications. Therefore, it is intended that the present invention include such modifications and variations as come within the scope of the appended claims and their equivalents.

What is claimed is:

1. A bearing apparatus for pivoting a carrying arm relative to an anchorage having a proximal end and a distal end, the bearing apparatus comprising:
   a bushing carried by the distal end of the carrying arm attached to the bushing such that the bushing is disposed between the carrying arm and the distal end;
   a pivot bearing assembly movably disposed in the bushing and configured to pivotably control the carrying arm, a portion of the pivot bearing assembly configured to slidingly engage a section of the bushing such that the carrying arm pivots when the portion engages the section;
   the pivot bearing assembly has a shaft with a first end and a second end and the portion is a come-along part movably disposed about the shaft, the first end in rotational communication with the carrying arm, the second end configured to be rotationally driven by a drive apparatus, the shaft configured to rotationally engage the come-along part, the come-along part configured to move axially of the shaft to slidingly engage the section upon rotation of the shaft; and
   a transfer plate removably attached to an area of the carrying arm and to the bushing proximate the first end, the transfer plate configured to transfer rotational movement of the control component to pivot the carrying arm.

2. The bearing apparatus as in claim 1, wherein the proximal end of the anchorage is attached to a vehicle.

3. The bearing apparatus as in claim 1, wherein the bushing is unitarily constructed with the anchorage.

4. The bearing apparatus as in claim 1, wherein the pivot bearing assembly includes a rotation axis substantially coaxially aligned with bushing.

5. The bearing apparatus as in claim 1, wherein the drive apparatus is a motor.

6. The bearing apparatus as in claim 1, wherein the shaft defines a threaded section and the come-along part defines a complementary threaded section, the threaded section and the complementary threaded section cooperable to translate the rotation of the shaft into a sliding movement of the come-along part.

7. The bearing apparatus as in claim 6, further comprising at least one lug depending from the come-along part and wherein the section defines at least one groove, the at least one lug configured to slidably seat in the at least one groove to guide the sliding movement of the come-along part.

8. The bearing apparatus as in claim 7, further comprising a control component defining at least one control curve, the control component disposed between the bushing and the come-along part such that the at least one lug extends through the at least one control curve into the at least one groove such that upon the sliding movement of the come-along part, the at least one control curve and the at least one lug cooperate to transfer the sliding movement into a rotational movement of the control Component.

9. The bearing apparatus as in claim 8, wherein the at least one lug is two lugs located substantially opposite each other, the at least one groove is two grooves located substantially opposite each other, and the at least one control curve is two control curves located substantially opposite each other.

10. The bearing apparatus as in claim 8, wherein the at least one control curve defines a start point and a stop point, the start and stop points configured to restrictively control the rotational movement of the control component by limiting a travel of the at least one lug between the start and stop points.

11. The bearing apparatus as in claim 8, wherein the rotational movement is reversible to reversibly pivot the carrying arm.

12. The bearing apparatus as in claim 1, wherein the transfer plate defines an extension removably attached to the area.

13. The bearing apparatus as in claim 1, wherein the first end defines a recess, the transfer plate defines a complementary recess, and further comprising a bearing rotationally disposed between the recess and the complementary recess to facilitate pivoting of the carrying arm.

14. The bearing apparatus as in claim 13, wherein the bearing is a ball.

15. A bearing assembly movably disposed in a bushing of a mountable apparatus for pivoting a mirror carrying arm, the bearing assembly comprising:
   a shaft rotatably disposed in the bushing, the shaft defining a rotation axis substantially coaxial with a longitudinal axis of the bushing;
   a come-along part movably disposed about the shaft and configured to slide parallel to the rotation axis when the shaft is rotated;
   a control component defining a curve transversely disposed adjacent the rotation axis, the control component rotatably disposed about the shaft, the curve configured for penetration by a portion of the come-along part wherein the portion engages the curve and rotates the control component when the come-along part is slidably moved by a shaft rotation; and
   a cover pivotably disposed adjacent the bearing assembly proximate the carrying arm, the cover configured to retain the bearing assembly in the bushing and further configured to transfer the rotation of the control component to pivot the carrying arm.

16. The bearing assembly as in claim 15, wherein the cover is removably connected to the control component and the carrying arm, the bushing affixed to the mountable apparatus such that the cover pivots with the carrying arm.

17. The bearing assembly as in claim 15, wherein the cover is removably connected to the control component and the mountable apparatus, the bushing affixed to the carrying arm such that the bushing pivots with the carrying arm.

18. The bearing assembly as in claim 15, further comprising a bearing rotationally disposed between a first end of the shaft and the cover to facilitate pivoting of the carrying arm.

19. The bearing assembly as in claim 18, wherein the shaft defines a projection and further comprising a disk disposed about the shaft proximate the projection such that the control component is rotatably pressed between the bearing and the disk to at least align the shaft with the rotation axis.

20. The bearing apparatus as in claim 19, further comprising a retainer attachable to the control component to retain the disk in the control component.

21. The bearing assembly as in claim 15, wherein the shaft defines a threaded portion matingly threaded in a complementary threaded portion of the come-along part, the shaft configured for rotation by an application of an external torque.

22. The bearing assembly as in claim 21, wherein the external torque is supplied by a motor in communication with a second end of the shaft.

23. The bearing assembly as in claim 15, wherein the portion is a lug depending from the come-along part, the lug configured extend through the curve and slidably seat in a guide groove of the bushing to guide the come-along part parallel to the rotation axis.

24. The bearing assembly as in claim 23, wherein the curve defines a start point and a stop point, the start and stop points configured to limit the rotational movement of the control component by restricting travel of the lug between the start and stop points.

* * * * *